Feb. 24, 1959    V. WITKOWSKI    2,874,607
FILM GATE

Filed Nov. 1, 1957    2 Sheets-Sheet 1

Victor Witkowski
INVENTOR.

BY R. Frank Smith
Steve W. Gremban
ATTORNEYS

Feb. 24, 1959 V. WITKOWSKI 2,874,607
FILM GATE
Filed Nov. 1, 1957 2 Sheets-Sheet 2
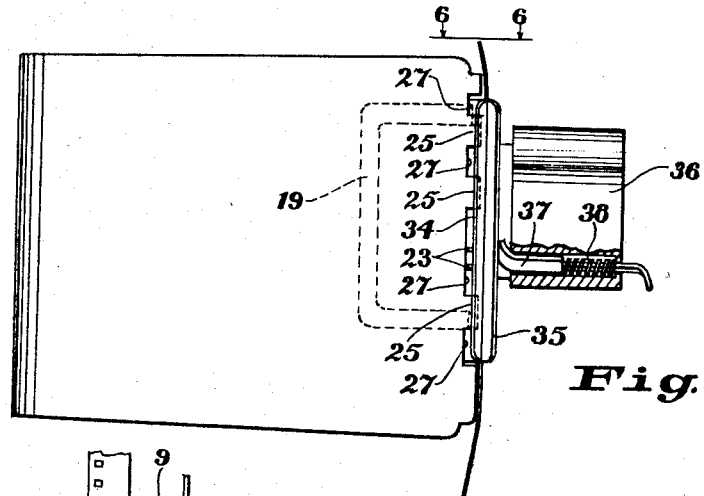
Fig. 3
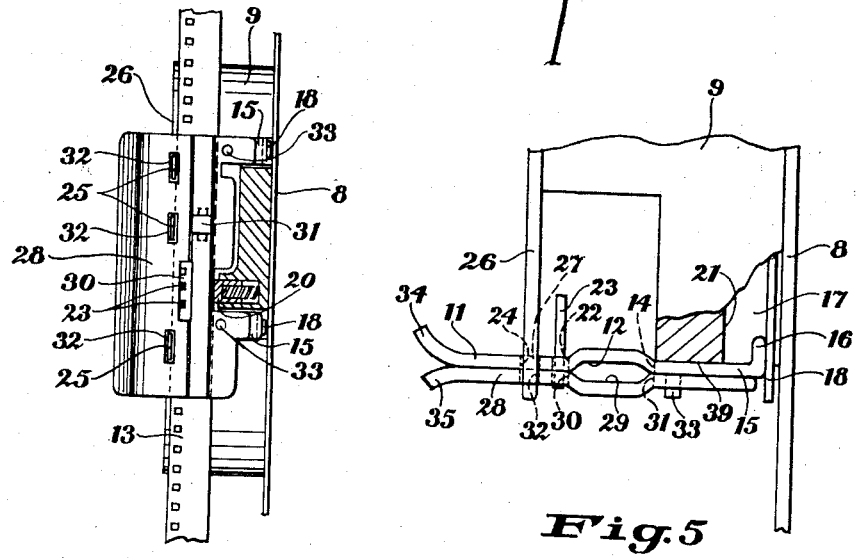
Fig. 4
Fig. 5
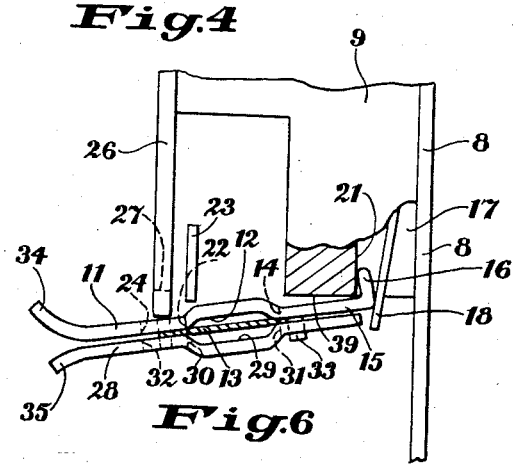
Fig. 6
Victor Witkowski
INVENTOR.
BY R. Frank Smith
Steve W. Gremban
ATTORNEYS

United States Patent Office 2,874,607
Patented Feb. 24, 1959

2,874,607
FILM GATE

Victor Witkowski, Rochester, N. Y., assignor to Eastman Kodak Company, Rochester, N. Y., a corporation of New Jersey Application November 1, 1957, Serial No. 693,900

9 Claims. (Cl. 88—17)

This invention relates generally to a film-guiding mechanism, and more specifically to a film gate for motion-picture apparatus for properly positioning and maintaining a film in a defined path for projection of the image recorded therein.

Experts in the motion-picture industry have been striving for years to design a satisfactory film gate for a projector that may be threaded with film or the film removed therefrom while the projector is operating without damage to the film. Experts have also been attempting to eliminate certain objectionable features of film gates presently on the market. Several of the objectionable features are: (1) the film gates are generally difficult to handle and thread, particularly without scratching the surface of the film; (2) in order to facilitate easy threading without damage to the film, many of these film gates are constructed as a removable unit that can only be threaded when completely removed from the projector; and (3) the film gates are generally complicated and relatively expensive to manufacture.

Therefore, one of the objects of this invention is to provide an improved film gate for a projector that is of simple design and construction, thoroughly reliable and efficient in operation, and economical to manufacture.

Another object of this invention is the provision of an improved film gate through which film may be threaded and removed therefrom while the projector is operating.

Still another object of the invention is the provision of an improved film gate that may be readily threaded with a minimum of trouble and effort.

One more object of the invention is to provide an improved film gate that may be readily threaded or loaded by the operator without necessitating extensive handling of the film gate structure with his hands.

Objects and advantages other than those set forth above will be apparent from the following description when read in connection with the accompanying drawings, in which Fig. 1 is a perspective view of a projector embodying the invention;

Fig. 3 is a view similar to Fig. 2 with the film gate in a film loading position;

Fig. 4 is a front elevation view of the film gate taken along line 4—4 of Fig. 2;

Fig. 5 is an enlarged plan view of the film gate taken along line 5—5 of Fig. 2 and with a portion thereof broken away;

Fig. 6 is a view similar to Fig. 5 taken along line 6—6 of Fig. 3; and

Figure 7:
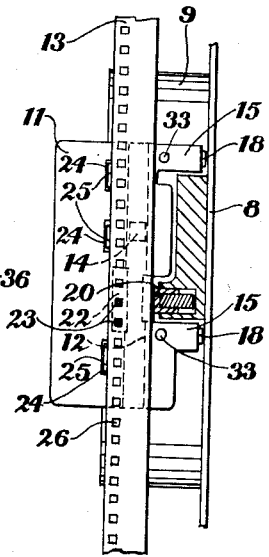
Fig. 7 is a view similar to Fig. 4 with the pressure pad removed.

In the drawings, a projector 7 is shown having a plate member 8 for supporting a housing 9 to which a film gate structure is mounted. The film gate structure comprises an aperture plate 11 as best seen in Figs. 5, 6 and 7, having a channel 12 in register with the image carrying portion of the film 13, and an aperture 14 shown dotted therein through which light is introduced to illuminate the image appearing on the film. The aperture plate 11 further has a pair of extending legs 15 bearing against the housing 9, and having lips 16 at the ends thereof disposed within slots 17 formed by the housing 9 as seen in Figs. 5 and 6. The lips 16 engage spring arms 18 formed by a U-shaped spring member 19, shown dotted in Fig. 3, secured to the housing 9, and further function as a stop means for the aperture plate 11 by engaging shoulders 21 formed by the slots 17 as seen in Fig. 6. The aperture plate 11 has an elongated slot 22 as seen in Fig. 7 aligned with the row of perforations of the film 13 and through which a claw 23 shown in Figs. 3, 4 and 5 of the projector pulldown mechanism extends to engage the film perforations. The aperture plate 11 is further provided with a plurality of elongated slots 24 adapted to receive complementary side guide lugs 25 formed by a cover plate 26 secured to the housing 9. A plurality of shoulders 27 are formed by the cover plate 26 at the base of the side guide lugs 25 as seen in Fig. 3 for a purpose to be explained hereinafter.

The film gate structure also includes a pressure pad 28 as best seen in Figs. 4 and 5 having a channel 29, aperture 31 and elongated slots 30, 32 similar to and in register with the channel 12, aperture 14 and elongated slots 22, 24 respectively of the aperture plate 11. The pressure pad 28 is provided adjacent one edge with openings adapted to receive complementary pins 33 carried by the aperture plate 11 as best seen in Figs. 5 and 6. The pins 33 serve the dual functions of positioning and detachably supporting the pad 28 on the plate 11, and providing an abutment means for the film gate adapted when the pins 33 are engaged and urged by one edge of the film 13 to place the film gate in a film projecting position from a film loading position. When the pressure pad 28 is in engagement with the aperture plate 11, the channels 12, 29 cooperate to form a passageway for the image carrying portion of the film 13 which is held out of frictional engagement with the aperture plate 11 and pressure pad 28. The film strip 13 is laterally guided through the film gate by a resilient guide member 20 bearing against one edge of the film 13 as seen in Fig. 7, and the other edge of the film bearing against the sides of the side guide lugs 25. Only the edge portions of the film 13 are frictionally interposed between the pad 28 and plate 11. The ends 34, 35 of the plate 11 and pad 28 respectively are flared outwardly to provide means for guiding the film 13 between the pad 28 and plate 11. A projection lens holder 36 is secured to the projector 7 and carries a plunger 37 biased by a spring 38 into engagement with the pad 28 to urge the pad 28 and plate 11 into film projecting position with the plate 11 bearing against a portion 39 of the housing 9 and the shoulders 27 formed by the cover plate 26 as seen in Figs. 2 and 5.

Figure 1:
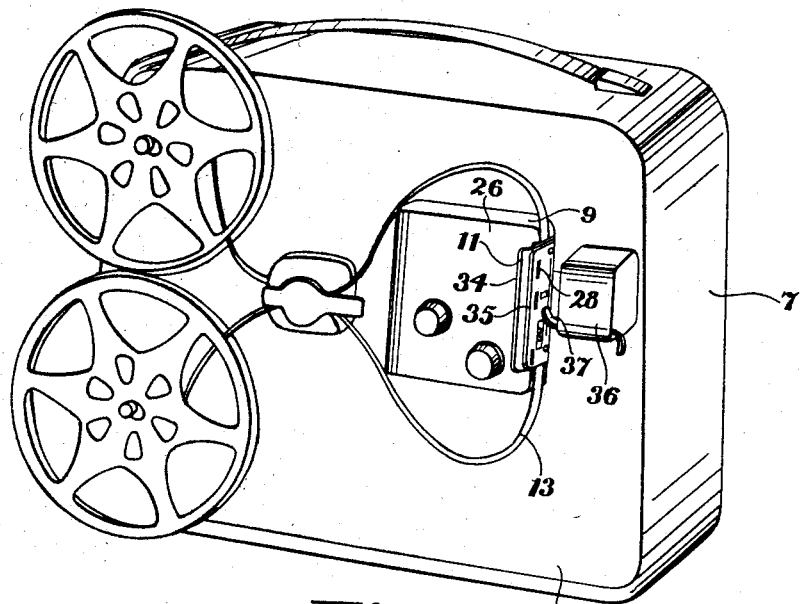
Figure 2:
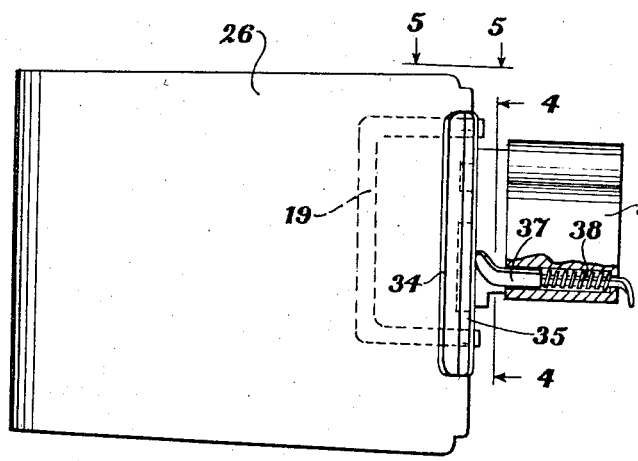
Fig. 2 is an enlarged, side elevation view of the film gate and housing disclosed in Fig. 1 with the film gate in an image projecting position.

In describing this invention, let us assume initially that the film gate is in the film-projecting position as shown in Figs. 2 and 5 with the pull down claw 23 in engagement with the film perforations to intermittently transport the film 13 through the film gate while the images thereon are projected on a screen. In this position, the lugs 25 extend through the elongated slots 24, 32 in the plate 11 and pad 28 and the spring biased plunger 37 urges the pad 28 into engagement with the plate 11 and the plate 11 against the housing 39 and shoulders 27. The spring arms 18 are under tension in this position, and it is the force exerted by the spring arms 18 against the lips 16 of the plate 11 and the force of the spring biased plunger 37 exerted against the pad 28 that maintains the film gate structure in the film-projecting position. Now let us assume that the operator has projected all of the film on the projector reel and desires to thread a new film through the film gate. The operator places a finger on the end 34 of the aperture plate 11 and urges the film gate gently to the right as seen in Fig. 2 against the bias of the plunger 37 and spring 38 until the lugs 25 are withdrawn from the openings 24, 32. As soon as the lugs 25 are clear of the openings 24 in the plate 11, the spring arms 18 urge the film gate structure into the film-loading position as shown in Figs. 3 and 6. In this position, the lips 16 bear against the shoulders 21 preventing further outward movement of the aperture plate 11, and the plate 11 bears against the ends of the side guide lugs 25. Also, the pulldown claw 23 no longer extends into the slots 22, 30 so that continued operation of the projector 7 has no effect on the film strip 13 within the film gate. The operator may thread the film 13 by grasping the film between the thumb and forefinger of each hand and urging the film between the pressure pad 28 and aperture plate 11 in a direction transverse to the direction of film travel through the film gate until the edge of the film 13 bears against the pin 33 as seen in Fig. 6. To place the film gate in the film-projecting position, the operator must exert a small force on the film 13 causing the edge of the film in contact with the pins 33 to urge the pins and film gate structure against the bias of the spring arms 18 until the openings 24, 32 are in register with the lugs 25. As soon as this occurs, the spring biased plunger 37 urges the film gate structure to the left into the film projecting position as seen in Fig. 2. The lateral positioning of the film 13 is accomplished by the resilient guide member 20 which engages one edge of the film 13 and urges the opposite edge of the film against the sides of the side guide lugs 25.

Although but one embodiment has been illustrated and described, it will be apparent to those skilled in the art that various changes and modifications may be made without departing from the spirit of the invention or from the scope of the appended claims.

I claim:

1. In a film gate structure for motion-picture film, the combination of: a support member having a lug extending in one direction; an aperture plate member disposed transverse to said lug and forming a slot for receiving said lug when said plate member is in a film projecting position; first resilient means in engagement with said plate member and adapted to urge said plate in a direction transverse to said lug into a film loading position with said plate engaging said lugs after said plate is manually urged in said one direction withdrawing said lug from said slot; a pressure pad member cooperating with said plate member to guide said film therebetween; abutment means carried by one of said pad and plate members; and second resilient means in engagement with said pad member and adapted to urge said pad and plate members in a direction opposite to said one direction, said second resilient means urging said pad and plate into said film projecting position after an edge of said film which is loaded in said film gate while in said film loading position engages said abutment means and urges said plate member against the bias of said first resilient means placing said slot in registry with said lug.

2. The invention as defined in claim 1 wherein said first resilient means comprises a spring.

3. The invention as defined in claim 1 wherein said aperture plate is provided at one end with a lip, and said first resilient means comprises a spring in engagement with said lip.

4. The invention as defined in claim 1 wherein said abutment means comprises a pin carried by said aperture plate and a complementary opening formed by said pressure pad for receiving said pin.

5. The invention as defined in claim 1 wherein said second resilient means comprises a spring biased plunger.

6. In a film gate structure for motion-picture film, the combination of: a support member having a plurality of lugs extending in one direction; an aperture plate disposed transverse to said lugs and having complementary slots for receiving said lugs when said plate is in a film projecting position, said plate further forming a pair of lips at one end thereof disposed within complementary recesses formed by said support member, said recesses terminating in shoulders formed by said support member; a spring member carried by said support member and having its legs in engagement with said lips to urge said plate in a direction transverse to said lugs into a film loading position with said lips engaging said shoulders and said plate engaging said lugs after said plate is manually urged in said one direction withdrawing said lugs from said slots; a pair of pins carried by said plate; a pressure pad forming complementary openings for receiving said pins and cooperating with said plate to guide the film therebetween; and a spring biased plunger in engagement with said pad and adapted to urge said pad and plate in a direction opposite to said one direction pressing said plate into engagement with said lugs to hold the film gate in said film loading position, said plunger urging said pad and plate into said film projecting position after an edge of the film which is loaded in the film gate while in said film loading position engages said pins and urges said plate against the bias of said spring member placing said slots in registry with said lugs.

7. In a film gate structure for motion-picture film, the combination comprising: a fixed member; a second member cooperating with said fixed member and movable relative thereto, said fixed and second members having cooperating projection and slot means which are interengaged when said second member is in a film projecting position; a third member movable with said second member and cooperating therewith to form a film guiding passageway therebetween; first biasing means urging said second and third members in a direction transverse to said projection means into a film loading position in which said projection and slot means are disengaged and offset; and a second biasing means for urging said second and third members into said film projecting position; whereby manual movement of said second and third members to disengage said slot and projection means permits said first biasing means to move said second and third members into said film loading position, and manual movement of said second and third members against the bias of said first biasing means to a position in which said projection and slot means are in alignment permits said second biasing means to move the second and third members into said film projecting position.

8. In a film gate structure for motion-picture film, the combination comprising: a fixed member having a projection extending in one direction; a second member movable relative to the fixed member and disposed transverse to said projection, said second member having a slot for receiving said projection when said second member is in a film projecting position; a third member movable with said second member and cooperating therewith to guide said film therebetween; first resilient means urging said second and third members in a direction transverse to said projection into a film loading position in which said slot is disengaged from and out of alignment with said projection and said second member rests against the projection; and second resilient means urging said second and third members in a direction substantially parallel to said projection into said film projecting position; whereby manual movement of said second and third members to disengage said slot from said projection permits said first resilient means to move said second and third members into said film loading position, and manual movement of said second and third members against the bias of said first resilient means to a position in which the projection and slot are in alignment permits said second resilient means to move the second and third members into said film projecting position.

9. Film gate structure according to claim 8 wherein one of said second and third members has a projection cooperating with a fixed part of the apparatus to limit the movement of said members under the influence of said first resilient means.

References Cited in the file of this patent

UNITED STATES PATENTS

| | | |
|---|---|---|
| 1,937,976 | Merle | Dec. 5, 1933 |
| 2,457,915 | Nemeth | Jan. 4, 1949 |